United States Patent Office 3,177,665
Patented Apr. 13, 1965

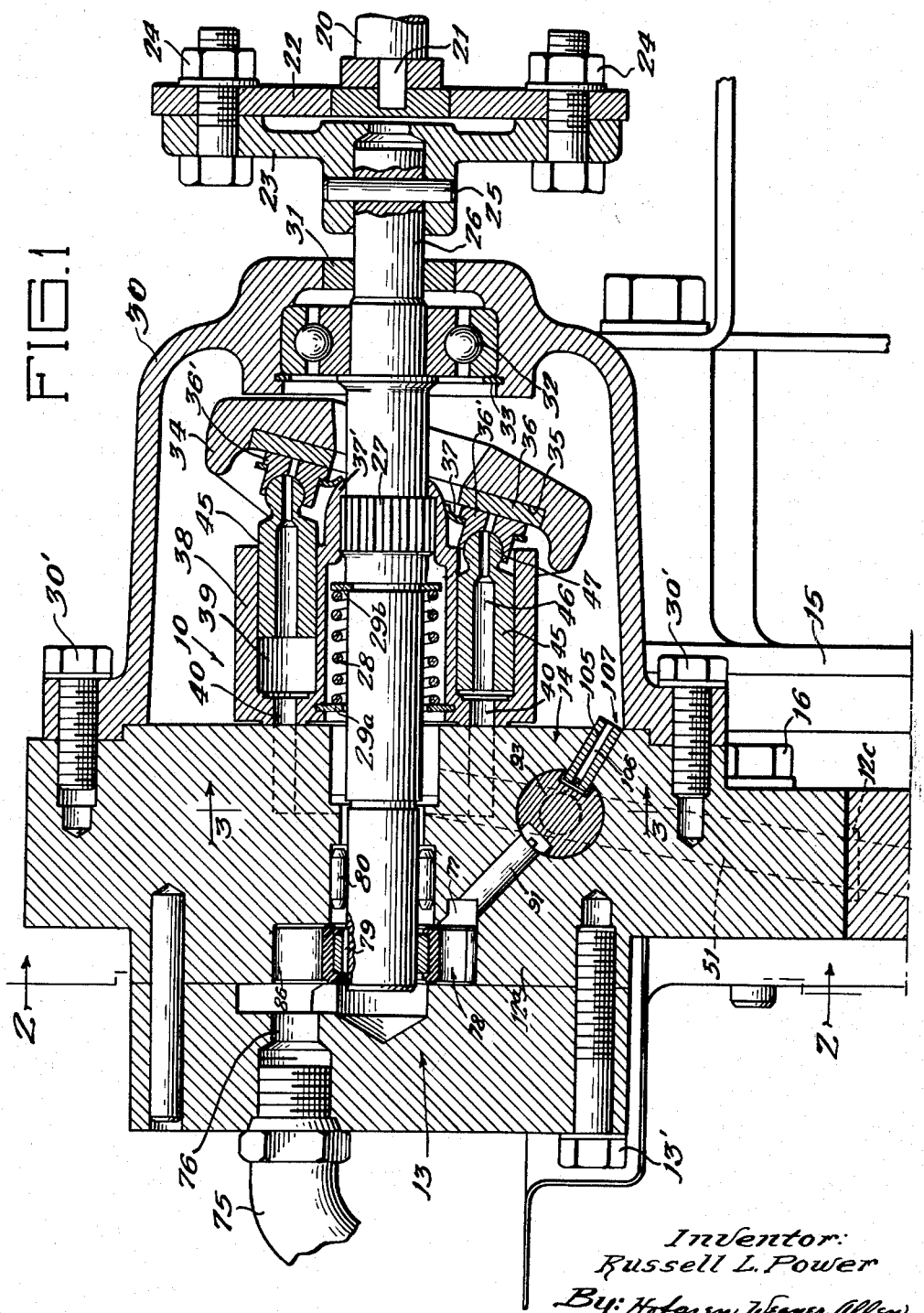

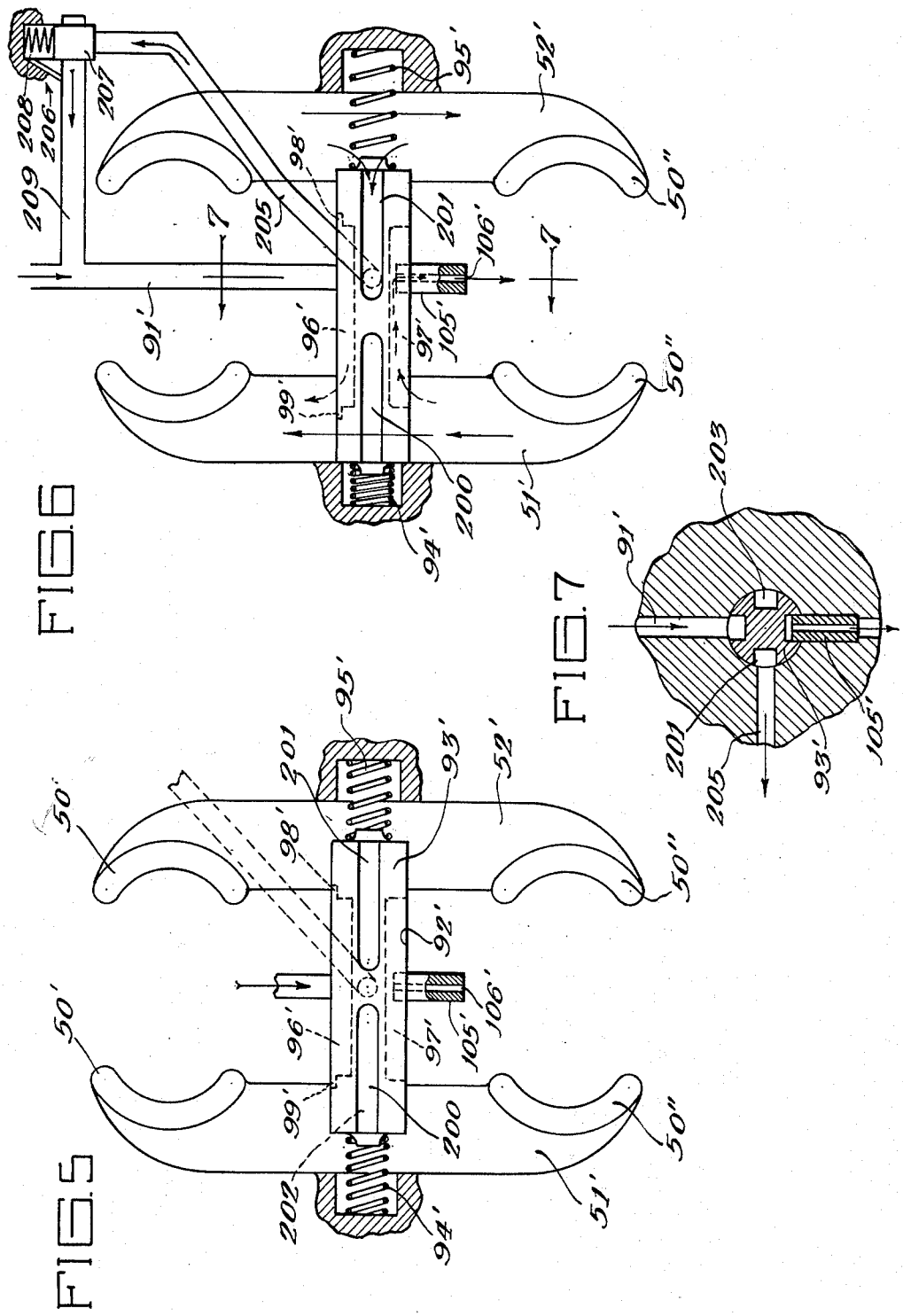

3,177,665
HYDROSTATIC TRANSMISSION
Russell L. Power, Rockford, Ill., assignor to Sundstrand Corporation, a corporation of Illinois
Filed Nov. 20, 1963, Ser. No. 325,000
15 Claims. (Cl. 60—53)

This invention relates to hydrostatic transmissions and more particularly to a hydrostatic transmission having a makeup pump and valve used for supplying makeup and cooling fluid in a main pump and motor circuit.

It is contemplated that the new and improved hydrostatic transmission disclosed herein may be used with any prime mover, and for a multitude of purposes; however, as an example, the transmission may be used with an internal combustion engine to drive the pump, and the hydraulic motor power may be utilized for propelling a garden tractor or the like.

It is therefore an object of the present invention to provide a new and improved hydrostatic transmission having new and improved valve means for controlling the fluid flow from the makeup pump to the low pressure side of the hydrostatic transmission circuit.

Another object of the present invention is to provide a new and improved valve means for a hydrostatic transmission positionable to allow makeup fluid to enter the hydrostatic transmission circuit, and to prevent discharge of fluid from the transmission circuit, when the transmission is in neutral.

It is also an object of the present invention to provide a new and improved valve means of the type described both for discharging heated fluid from the transmission circuit and admitting makeup and cooling fluid to the transmission circuit to prevent undue temperature rise therein.

Yet another object of the present invention is to provide a new and improved valve means of the type described including a plurality of grooves thereon providing for high pressure relief in the transmission.

A further object of the present invention is to provide new and improved valve means for a hydrostatic transmission.

Other objects and advantages will become readily apparent from the following detailed description when taken in connection with the accompanying drawings in which:

FIG. 1 is a sectional view of a portion of the hydrostatic transmission;

FIG. 5 is a hydraulic circuit diagram with a modified valve apparatus showing the valve member in the neutral position;

FIG. 6 is a hydraulic circuit diagram similar to FIG. 5 showing the valve member in an operating position; and FIG. 7 is a cross-sectional view of the valve taken at about line 7—7 of FIG. 6.

Figure 1A:
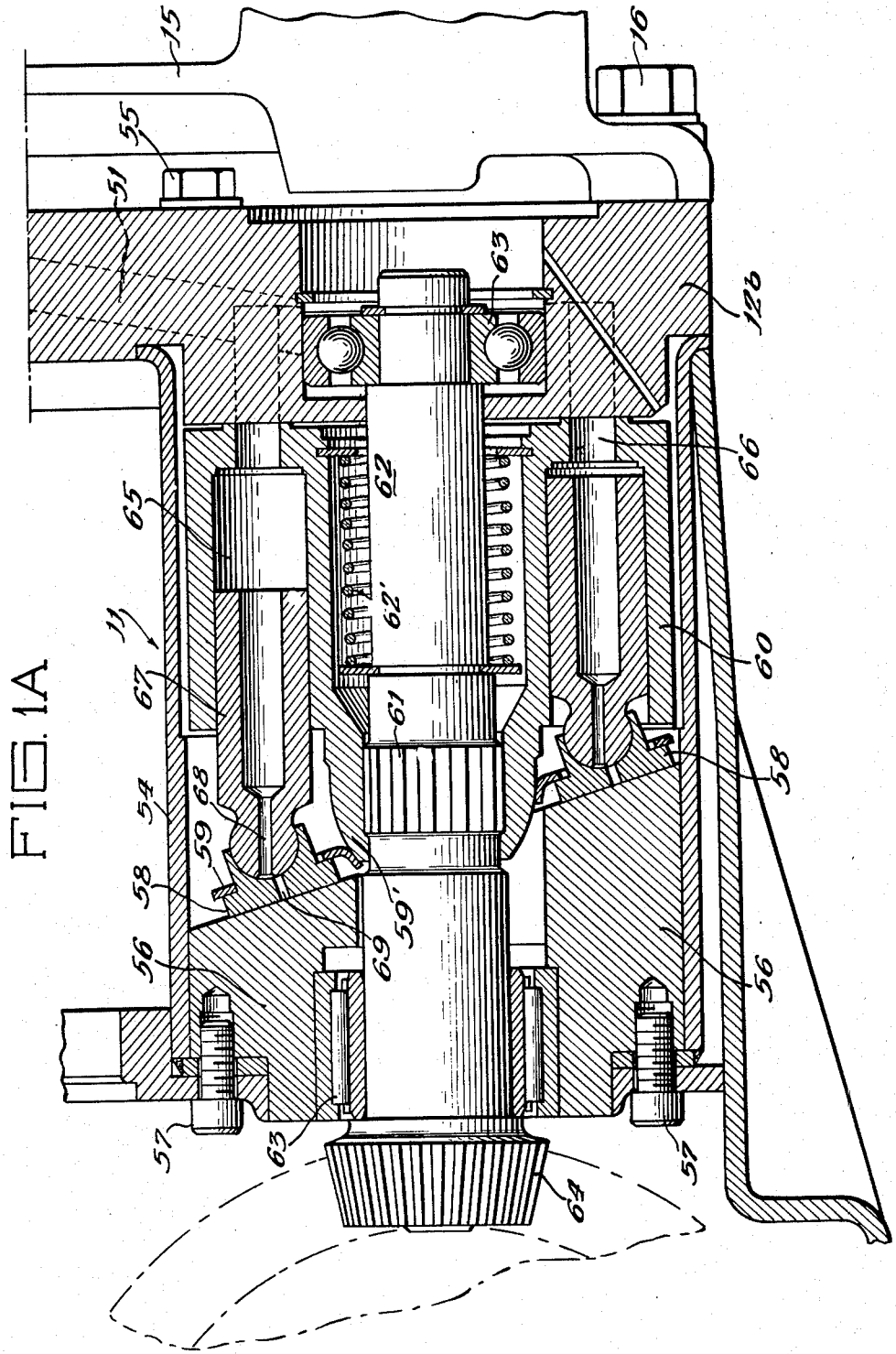
FIG. 1A is a sectional view of the remainder of the hydrostatic transmission.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

Referring now to the drawings, the hydrostatic transmission is shown in its environment in FIGS. 1 and 1A and consists of a variable displacement axial piston pump 10, a fixed displacement axial piston motor 11, and valve plate 12a and 12b with passages hydraulically connecting the pump and motor. A seal, 12c, forms a fluid-tight joint between plates 12a and 12b. Included in the valve plate 12a are a charge pump 13 and a cylindrical valve 14. Bolt 13' retains a cover on valve plate 12a, thereby providing access to charge pump 13. The entire hydrostatic transmission is mounted on a frame 15, such as a tractor frame, as with bolts 16 attaching plates 12a and 12b to the frame in a suitable manner.

The pump 10 is driven by a shaft 20, which is driven by a prime mover (not shown). The shaft 20 is keyed as at 21 to a coupling 22 which is affixed to a coupling 23 as by bolts, washers and nuts 24 as is well known in the art. A pin 25 rigidly affixes a shaft 26 to coupling member 23 so that when shaft 20 is rotating, shaft 26 will be driven at an equal speed and in the same direction. The shaft 26 drives the pump 10 through splines 27 as will be discussed in detail hereinafter.

The pump 10 includes a housing 30 affixed to the valve plate 12a as at 30' and includes a fluid-tight seal around shaft 26 as at 31. The housing 30 also supports a bearing 32 which permits shaft 26 to rotate within the housing. A retainer ring 33 holds bearing 32 firmly positioned in housing 30.

Within the housing 30 the axial piston pump is of a type generally known in the art and will be described only briefly. The pump includes an adjustable swashplate 34 having a bearing surface 35 on which an annular ring 36 is rotatable. A plurality of bearing shoes 36' bear on ring 36 and are held in position by a retaining ring 37 which bears against spherical projection 37' on a cylinder block 38.

The cylinder block 38 is affixed to shaft 26 as by splines 27 to rotate therewith and is urged against valve plate 12a by a spring 28 bearing at opposite ends against snap rings 29a and 29b in the cylinder block and on the shaft respectively. The cylinder block 38 includes a plurality of cylinders 39 having inlet and outlet ports as at 40. Positioned in the cylinders 39 are pistons 45 having oil grooves therein as at 46. These oil grooves extend through the spherical heads 47 of the pistons thereby lubricating the piston heads 47 as they contact shoes 36', which shoes maintain the pistons 45 against ring 36 and the swashplate 34. As driven shaft 20 drives shaft 26, the cylinder block 38 will rotate thus moving the pistons 45 in cylinders 39 and causing hydraulic fluid to flow through ports 40.

Figure 3:
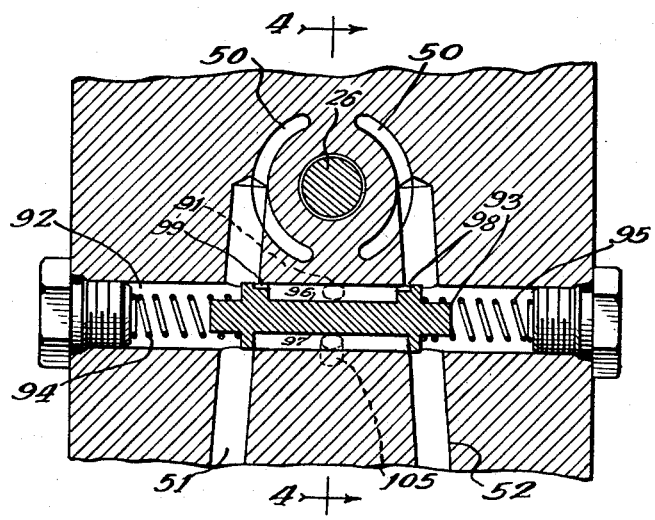
FIG. 3 is a sectional view taken at about line 3—3 in FIG. 1 showing a control valve in the hydrostatic transmission circuit.

Ports 40 communicate through the usual arcuate inlet and outlet ports 50 (as best shown in FIG. 3) with fluid conduits 51 and 52 in valve plates 12a and 12b. These fluid conduits (as shown in FIG. 1A) conduct hydraulic fluid to and from the motor 11 through arcuate inlet and outlet ports (not shown) similar to those at 50.

The motor 11 includes a housing 54 which forms a fluid-tight assembly affixed to valve plate 12b as at 55. Within the housing 54, the motor includes a fixed swashplate 56 attached to the housing as by bolts 57. A plurality of bearing shoes 58 bear against swashplate 56, and shoes 58 are held in place by retaining ring 59. Ring 59 is positioned in the motor 11 similarly to ring 37 in the pump 10 and bears against spherical projection 59' on a cylinder block 60.

The rotating cylinder block 60 is splined as at 61 to a shaft 62 supported as by bearings 63. A spring 62' urges block 60 against valve plate 12b. The shaft includes a means for transmitting power at its free end, which as shown herein, is a bevel gear as at 64. As is usual in the art, rotating cylinder block 60 includes a plurality of cylinders 65 having inlet and outlet ports 66. Pistons 67 are movably mounted in cylinder 65 and each includes an oil passage 68 which permits lubrication of the bearing shoes 58 against the swashplate 56 through an orifice 69. The bearing shoes 58 retain the spherical heads of pistons 67 as is usual in the art.

Therefore, hydraulic fluid from one of conduits 51 and 52 is pumped into motor 11 from pump 10 as described hereinabove, and operates pistons 67 thereby rotating cylinder block 60 and driving output shaft 62 splined to the cylinder block.

Starting, stopping, speed and direction of the hydrostatic transmission output are controllable by suitable manual linkage (not shown) connected to the variable pump swashplate 34. The swashplate is movable in opposite directions from a neutral center position in a conventional manner, and such swashplate movement varies the fluid flow in the hydrostatic transmission.

Figure 2:
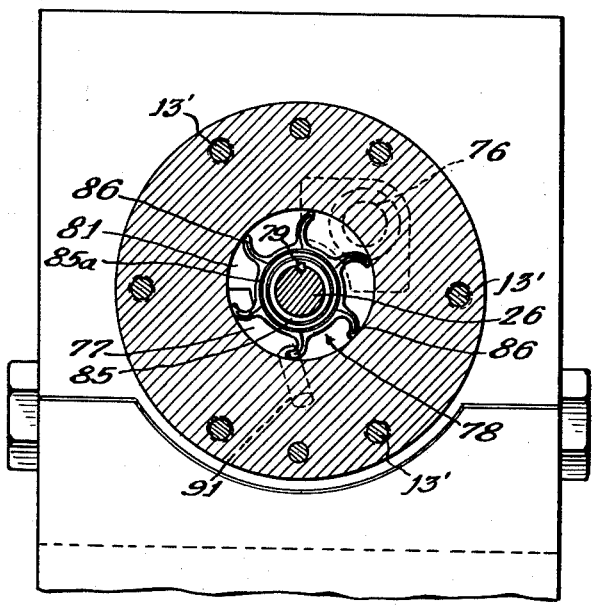
FIG. 2 is a sectional view taken at about line 2—2 of FIG. 1 showing the makeup pump and its elements.

The charge pump 13 (as shown in FIG. 1) is connected to a source of hydraulic fluid as at 75, which fluid enters the charge pump as at intake 76 (as best shown in FIG. 2). The charge pump also includes an outlet port as at 77. Charge pump 13 includes an impeller wheel 78 affixed to shaft 26 as by a key 79. Bearings 80 (shown in FIG. 1) support the shaft 26 adjacent the charge pump and as shaft 26 is rotated, impeller wheel 78 is rotated in charge pump chamber 81. The chamber 81 is eccentric about the shaft 26 and the inlet and outlet are located near opposite extremes of eccentricity so that the fluid area between blades is decreased as the impeller wheel 78 moves from the impeller inlet 76 to the outlet 77. This increases the fluid pressure at the outlet side of the charge pump relative to that at the inlet side.

Impeller wheel 78 is made up of an inner ring 85 which is of a rigid material, usually metallic, and a plurality of resilient blades 86 projecting from a hub 85a of similar resilient material. Hub 85a is bonded to the impeller inner ring 85. In the arrangement shown, the impeller blades 86 have a substantially uniform thickness and fit tightly in the pump chamber 81. As the impeller wheel 78 is rotated, the blades 86 convey hydraulic fluid within the charge pump 13 from the inlet 76 to the outlet 77. Since the impeller blades are comprised of a resilient material, the blades may flex circumferentially within the pump chamber 81 when the pressure in the charge pump becomes great enough. Therefore, the charge pump pressure is dependent upon a plurality of conditions, including the number of impeller blades therein, the stiffness of the resilient material of the blades and the driven speed of shaft 26. When the charge pump pressure at the outlet 77 thereof exceeds the desired pressure, the resilient blades 86 may yield circumferentially and radially away from the outer peripheral wall of the pump chamber 81 thereby allowing hydraulic fluid to return to the inlet of the charge pump and thus preventing pressure rise within the charge pump above the desired value.

From the outlet 77 of the charge pump, the hydraulic fluid flows through makeup conduit 91 to a cylindrical valve chamber 92. This valve chamber communicates with conduits 51 and 52 (as best shown in FIG. 3), and as will be described hereinafter, permits the makeup fluid from the charge pump to flow to conduit 51 or 52, whichever has the lower pressure. This flow of makeup fluid is through a branch circuit which is formed by the valve chamber 92 and a cylindrical shuttle valve member 93 in the chamber 92.

Figure 4:
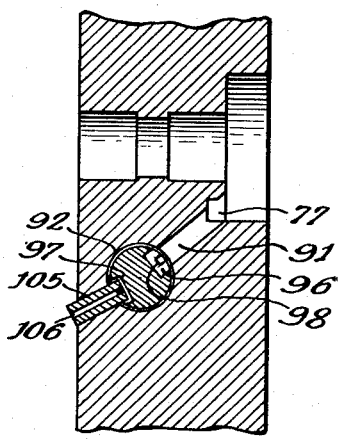
FIG. 4 is a sectional end view of the valve taken at about line 4—4 in FIG. 3.

The valve member 93 is movably located in valve chamber 92 and positioned therein between conduits 51 and 52 (as best shown in FIG. 3) by springs 94 and 95. The valve member 93 includes a pair of opposed longitudinally disposed slots 96 and 97 one at each side of the valve (as best shown in FIG. 4), and each slot is of a length less than valve member 93. Slot 96 has reduced end portions as at 98 and 99 providing restricted orifices placing makeup conduit 91 in communication with conduits 51 and 52 when valve member 93 is in the neutral center position shown. Thus, when the pump 10 is in neutral and the pressure in conduits 51 and 52 is equal, the springs 94 and 95 will position the spool valve 93 between the conduits 51 and 52 (as shown in FIG. 3), and allow makeup fluid from conduit 91 to flow into slot 96, and through the reduced end portions 98 and 99 into both the conduits 51 and 52 to fill the system. In this neutral position there is no communication of slot 97 with conduits 51 and 52 because of the angular disposition of the conduits 51 and 52. Thus no fluid is purposely released from the fluid circuit and the charge pump only supplies a leakage makeup. However, when the pump 10 is in stroke, in one direction or the other, the conduit 51 or 52 having the higher pressure therein, will supply pressure to move the valve member to close the high pressure conduit from the charge pump fluid and will allow the charge pump fluid to only flow to the low pressure conduit. This always provides a charge pump pressure to the inlet side of the pump 10 regardless of the direction of rotation of the hydrostatic transmission motor and thus insures a supply of fluid to fill cylinders 39 of pump 10 and replenish leakage. It should be noted that the valve member groove 96, through which makeup fluid is supplied, is disposed on that side of the valve member toward the pump and away from the motor. Thus makeup fluid is always directed toward the hydrostatic transmission pump.

A conduit 105 extends between the valve member 93 and the inside of the pump housing 30 (as best shown in FIG. 1). This conduit 105 extends into the slot 97 and includes a restricted orifice 106 therethrough. By extending into slot 97, conduit 105 prevents valve member 93 from rotating in valve chamber 92. Thus, at all times, except in the neutral valve position as described above, it is possible for heated hydraulic fluid to flow from the valve chamber 92 and more particularly from the slot 97 of the valve member 93 through the orifice 106 into the chamber at 107 inside housing 30 of pump 10. As the heated fluid returns to the pump 10, cool fluid is supplied from hydraulic fluid supply 75 by the charge pump 13 and the fluid circuit of the hydrostatic transmission is always completely full. It should be noted that groove 97 is disposed toward motor 11 and intercepts hot fluid returning from the motor while restricted passage 106 limits heated fluid discharge and maintains a predetermined back pressure. Thus, charge pump 13 supplies cooling fluid in excess of quantities necessary to make up leakage.

It is, of course, possible to maintain various working pressures in this type of hydrostatic transmission. It is, however, contemplated in the examples disclosed that the working pressure of the hydrostatic transmission will be about 3,000 p.s.i., and a 70 p.s.i. yield pressure will be designed in the charge pump. When the hydrostatic transmission is at idle, it is contemplated that the charge pump will produce about 40–50 p.s.i. and as the rotational speed shaft 26 is increased, the pressure within the charge pump will increase correspondingly until the yield point (about 70 p.s.i.) of the impeller wheel blades is reached.

As shown in FIGS. 5, 6 and 7, in a second embodiment the shuttle valve may include means for porting high pressure fluid to a relief valve means for preventing extreme high pressure in the high pressure side of the hydrostatic transmission. Reference numbers primed, similar to those used in the description of the first embodiment, are used on similar elements in the description of the second embodiment.

FIG. 5 shows the valve in neutral position, and illustrates valve components including a valve chamber 92' and a valve member 93'. The valve chamber 92' is located between and intersecting conduits 51' and 52' which communicate with pump inlet and outlet ports 50' as in the first embodiment and similar motor ports 50". Springs 94' and 95' are utilized to centrally position the valve member 93', and the valve member includes opposed slots 96' and 97', slot 96' having restricted passages 98' and 99' at the ends thereof, as in the first embodiment. A conduit 105' having a restricted orifice 106' therein extends into slot 97' for draining heated hydraulic fluid as was described hereinabove in the description of the first valve member embodiment.

In order to port high pressure fluid to a relief valve, valve member 93' has a pair of grooves 200 and 201 along one side thereof between slots 96' and 97' on the periphery of the valve member 93'. The grooves 200 and 201 are similar and each extends from an end of valve member 93' to a position just off the center of the valve member. A conduit 205 extends into valve chamber 92' at the center thereof (as best shown in FIG. 6) in the line of movement of grooves 200 and 201. The conduit leads to a relief valve 206 having a plunger 207 biased by a spring 208 and adapted to connect passage 205 with a passage 209 leading to the makeup conduit 91' for a purpose to be described.

In order to hydraulically balance valve member 93', it is provided with grooves on the opposite side from grooves 200 and 201, identical to the latter and opposed respectively thereto, one visible at 203 in FIG. 7, each to contain balancing fluid when its opposed groove has fluid.

In operation, the valve means functions in the following manner. When the fluid pressures are equal in conduits 51' and 52' (FIG. 5), the valve member 93' is centered in the valve chamber. In this position none of grooves 200–203 is in communication with conduit 205. This positioning of valve member 93' allows a limited amount of fluid to flow from the makeup conduit 91' through slot 96' and into conduits 51' and 52' through restricted orifices 99' and 98'. The restricted orifices improve the action of the valve member by making fluid available at ports 50' as soon as the charge pump starts. This action fills the fluid circuit as soon as the prime mover (not shown) starts and before an output speed of the hydrostatic transmission is called for.

As an output of the hydrostatic transmission is called for, a pressure differential in conduits 51' and 52' is realized. This pressure differential acts against the ends of valve member 93' thus moving the valve, for example, to the position as shown in FIG. 6. In this position makeup fluid from makeup conduit 91' flows into the lower pressure conduit, and the heated fluid discharge conduit 105' is in communication with the lower pressure conduit. The high pressure conduit (here shown as 52') is permitted to communicate with conduit 205 by positioning slot 201 in connection therewith. At the same time the opposing slot (in this instance 203) will also have hydraulic fluid therein from the high pressure side and will provide hydraulic balance to the valve member thereby preventing binding of the valve member 93' in the valve chamber 92'. With the valve member 93' in this position, hydraulic fluid flows from conduit 52' through groove 201 into conduit 205 and when the high pressure exceeds a predetermined value, valve 206 opens. Plunger 207 allows fluid flow and high pressure fluid flows into conduit 209 back to makeup conduit 91' thereby relieving the fluid circuit of excess high pressure.

The operation of the relief valve means would be similar but would utilize groove 200 if conduit 51' were the high pressure side. Thus a single valve means has been illustrated which can function as a means for introducing cooling fluid and makeup fluid to the fluid circuit, a means for draining hot fluid from the fluid circuit, a means for relieving high pressure in the fluid circuit, and any combination of these three functions.

I claim:
1. In a hydrostatic transmission, a first pump having an inlet and an outlet; a motor having an inlet and an outlet; a first conduit connecting the first pump outlet and the motor inlet so that the first pump delivers fluid under pressure to drive the motor; a second conduit connecting the motor outlet and the first pump inlet so that the motor returns fluid to the first pump; a makeup pump for supplying makeup and cooling fluid; a makeup conduit leading from the makeup pump; a valve member controlling communication between the makeup conduit and the first and second conduits and responsive to pressure in the higher pressure conduit of the first and second conduits to connect the makeup conduit to the lower pressure conduit of the first and second conduits for delivering makeup and cooling fluid to the lower pressure conduit; a heated fluid discharge conduit; and valving on said valve member for connecting the lower pressure conduit to the heated fluid discharge conduit for withdrawing heated fluid.

2. The mechanism as described in claim 1 wherein said heated fluid discharge conduit includes a restricted orifice therein for controlling the amount of heated fluid passing through said fluid discharge conduit.

3. The combination as described in claim 1 including a high pressure relief conduit and valving on said valve member for connecting the higher pressure conduit to the relief conduit.

4. In a hydrostatic transmission, a first pump having an inlet and an outlet; a motor having an inlet and an outlet; a first conduit connecting the first pump outlet and the motor inlet so that the first pump delivers fluid under pressure to drive the motor; a second conduit generally alongside the first conduit and connecting the motor outlet and the first pump inlet so that the motor returns fluid to the first pump; a makeup pump for supplying makeup and cooling fluid; and valve means controlling the supply of makeup fluid to the first and second conduits including a valve chamber intersecting the first and second conduits, a makeup conduit from the makeup pump communicating with the valve chamber intermediate the first and second conduits, a valve member in said valve chamber movable in opposite directions from a neutral center position and having a reduced portion thereon communicating the makeup conduit with the first and second conduits when the valve member is in the neutral position, opposite ends on the valve member exposed respectively to fluid pressure in the first and second conduits so that fluid in the higher pressure conduit moves the valve member to communicate the makeup conduit with the lower pressure conduit of the first and second conduits and block the makeup conduit from the higher pressure conduit of the first and second conduits, and means for normally maintaining the valve member in the neutral position when the pressure in the first and second conduits is equal.

5. The combination as described in claim 4 including a high pressure relief conduit communicating with said valve chamber intermediate the first and second conduits, a high pressure relief valve means in said relief conduit, and valving on said valve member for connecting the higher pressure conduit to the relief conduit and blocking communication between the high pressure relief conduit and the lower pressure conduit.

6. In a hydrostatic transmission, a first pump having an inlet and an outlet; a motor having an inlet and an outlet; a first conduit connecting the first pump outlet and the motor inlet so that the first pump delivers fluid under pressure to drive the motor; a second conduit generally alongside said first conduit and connecting the motor outlet to the first pump inlet so that the motor returns fluid to the first pump; a makeup pump for supplying makeup and cooling fluid; and valve means including a valve chamber intersecting said first and second conduits, a valve member movable in said chamber and having first and second opposed longitudinal slots at opposite sides thereof respectively facing the motor and first pump, a makeup conduit from the makeup pump communicating with the valve chamber between the first and second conduits adjacent the second slot in the valve member, a heated fluid discharge conduit communicating with said valve chamber between the first and second conduits adjacent the first slot in said valve member, said first slot having a length to block communication between said heated fluid discharge conduit and said first and second conduits when the pressure in said first and second conduits is equal, opposite ends on said valve member exposed respectively to fluid pressure in the first and second conduits so that fluid in the higher pressure conduit moves the valve member to communicate the makeup conduit with the lower pressure conduit and to communicate said heated fluid discharge conduit with the lower pressure conduit while blocking communication of the makeup conduit and heated fluid discharge conduit with the higher pressure conduit.

7. The mechanism as described in claim 6 including means in the heated fluid discharge conduit for restricting fluid flow therethrough.

8. The mechanism as described in claim 6 whereby said heated fluid discharge conduit extends into said first slot thereby preventing rotation of said valve member.

9. In a hydrostatic transmission, a first pump having an inlet and an outlet; a motor having an inlet and an outlet; a first conduit connecting the first pump outlet and motor inlet so that the first pump delivers fluid under pressure to drive the motor; a second conduit generally alongside said first conduit and connecting the motor outlet and the first pump inlet so that the motor returns fluid to the first pump; a makeup pump for supplying makeup and cooling fluid; and valve means controlling the supply of makeup fluid to said first and second conduits including a valve chamber intersecting the first and second conduits, a valve member in said valve chamber movable in opposite directions from a neutral center position and having first and second opposed longitudinal slots at opposite sides thereof respectively facing the motor and first pump, a makeup conduit from the makeup pump communicating with said valve chamber between the first and second conduits adjacent the second slot in said valve member, said second slot having a length to communicate with the first and second conduits when the valve member is centered, means for centering said valve member in said valve chamber, a heated fluid discharge conduit communicating with said valve chamber between the first and second conduits adjacent the first slot in said valve member, said first slot having a length to block communication of said heated fluid conduit with said first and second conduits when the valve member is centered, opposite ends on the valve member exposed respectively to fluid pressure in the first and second conduits so that fluid in the higher pressure conduit moves the valve member to communicate the makeup conduit with the lower pressure conduit and to communicate said heated fluid discharge conduit with the lower pressure conduit while blocking communication of the makeup conduit and heated fluid discharge conduit with the higher pressure conduit.

10. The mechanism as described in claim 9 in which the first and second slots are of equal length and said first and second conduits are inclined toward each other in the direction of the first pump so that the first slot is blocked from both said first and second conduits and said second slot communicates with both the first and second conduits when the valve member is centered.

11. The combination as described in claim 9 including a pair of longitudinal grooves on said valve member, one of said grooves extending from one end of the valve member to a position adjacent the center of the valve member and one of said grooves extending from the other end of the valve member to a position adjacent the center of the valve member, each of said grooves being of a length less than the length of the valve member, a relief conduit communicating with the center of the valve chamber, and valve means in said relief conduit so that the higher pressure conduit of the first and second conduits will communicate through one of said grooves with the relief conduit thereby providing a relief flow of higher pressure fluid.

12. A valve apparatus for use in a hydrostatic transmission, comprising: a valve body; a first conduit through the valve body; a second conduit through the valve body generally alongside the first conduit; a valve chamber in the valve body intersecting said first and second conduits; a valve member movable in said chamber and having first and second opposed longitudinal slots at opposite sides thereof respectively facing opposite ends of the conduits; a first passage in the valve body communicating with the valve chamber between the first and second conduits adjacent the second slot in the valve member; a second passage in the valve body communicating with said valve chamber between the first and second conduits adjacent the first slot in said valve member, said first slot having a length to block communication between said second passage and said first and second conduits when the pressure in said first and second conduits is equal; and opposite ends on said valve member exposed respectively to fluid pressure in the first and second conduits so that fluid in the higher pressure conduit moves the valve member to communicate said first and second passages with the lower pressure conduit, while blocking communication of the first and second passages with the higher pressure conduit.

13. A valve apparatus for use in a hydrostatic transmission, comprising: a valve body; a first conduit through the valve body; a second conduit through the valve body generally alongside the first conduit; a valve chamber in the valve body intersecting the first and second conduits; a valve member in said valve chamber movable in opposite directions from a neutral center position and having first and second opposed longitudinal slots at opposite sides thereof respectively facing opposite ends of the conduits; a first passage in the valve body communicating with said valve chamber between the first and second conduits adjacent the second slot in said valve member, said second slot having a length to communicate with the first and second conduits when the valve member is centered; means for centering said valve member in said valve chamber; a second passage in the valve body communicating with said valve chamber between the first and second conduits adjacent the first slot in said valve member, said first slot having a length to block communication of said second passage with said first and second conduits when the valve member is centered; and opposite ends on the valve member exposed respectively to fluid pressure in the first and second conduits so that fluid in the higher pressure conduit moves the valve member to communicate the first and second passages with the lower pressure conduit while blocking communication of the first and second passages with the higher pressure conduit.

14. The apparatus as described in claim 13 in which the first and second slots are of equal length and said first and second conduits are inclined toward each other so that the first slot is blocked from both said first and second conduits and said second slot communicates with both the first and second conduits when the valve member is centered.

15. The valve apparatus as described in claim 13 including a pair of longitudinal grooves on said valve member, one of said grooves extending from one end of the valve member to a position adjacent the center of the valve member and one of said grooves extending from the other end of the valve member to a position adjacent the center of the valve member, each of said grooves being of a length less than half the length of the valve member, a relief conduit communicating with the center of the valve chamber, and valve means in said relief conduit so that the higher pressure conduit of the first and second conduits will communicate through one of said grooves with the relief conduit thereby providing a relief flow of higher pressure fluid.

No references cited.

JULIUS E. WEST, *Primary Examiner*.